(12) United States Patent
Lukac

(10) Patent No.: US 8,306,335 B2
(45) Date of Patent: Nov. 6, 2012

(54) METHOD OF ANALYZING DIGITAL DOCUMENT IMAGES

(75) Inventor: Rastislav Lukac, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/075,978

(22) Filed: Mar. 30, 2011

(65) Prior Publication Data

US 2012/0250105 A1 Oct. 4, 2012

(51) Int. Cl.
*G06K 9/46* (2006.01)
*G06K 9/66* (2006.01)

(52) U.S. Cl. ........ 382/190; 358/461; 358/462; 382/165; 382/176

(58) Field of Classification Search .................. 358/461, 358/474; 382/165, 173, 190, 260, 270
See application file for complete search history.

(56) References Cited

U.S. PATENT DOCUMENTS

| | | | |
|---|---|---|---|
| 6,307,962 B1 | 10/2001 | Parker et al. | |
| 6,771,836 B2 * | 8/2004 | Lawton | 382/260 |
| 6,806,980 B2 * | 10/2004 | Xu et al. | 358/474 |
| 6,999,616 B2 * | 2/2006 | Nacken | 382/165 |
| 7,379,593 B2 * | 5/2008 | Fan et al. | 382/173 |
| 7,693,329 B2 | 4/2010 | Chelvayohan et al. | |
| 8,050,499 B2 * | 11/2011 | Kanatsu | 382/173 |
| 2007/0201743 A1 * | 8/2007 | Ferman | 382/168 |
| 2008/0137954 A1 * | 6/2008 | Tang et al. | 382/176 |
| 2008/0175476 A1 * | 7/2008 | Ohk et al. | 382/176 |
| 2010/0202026 A1 * | 8/2010 | Chiu et al. | 358/488 |

FOREIGN PATENT DOCUMENTS

WO 0111864 A2 2/2001

* cited by examiner

*Primary Examiner* — Gregory M Desire

(57) ABSTRACT

Analyzing an input image, the input image being one of a digitized image stored in a memory or a scanned image from a scanner. Forming a feature image from the input image by dividing the input image into a plurality of blocks of pixels, thus associating each block of pixels in the input image with a single pixel in the feature image, and outputting the feature image for further analysis or storage in a memory. Example embodiments extract and analyze features from a document image to detect particular characteristics associated with the page area, the distortion area, and the book spine area. Extracted features can be further analyzed to detect document characteristics at the paragraph, line, word, and character levels.

11 Claims, 3 Drawing Sheets

METHOD OF ANALYZING DIGITAL DOCUMENT IMAGES

BACKGROUND

The present invention relates to scanning documents and particularly to scanning books.

Scanned images of book pages often have three types of distortions generated by scanning. Depending on the book's orientation relative to the scanning direction when it lays on the scanning surface and the elevation of the book spine area above the surface, these three types of distortion appear at different levels. As shown in FIG. 1, when the book spine is above the scanning surface the scanned image usually has shadows appearing in the image close to the spine. The other two types of distortions happen for the same reason but only when a book is scanned with its spine parallel to the scanner sensor bar, referred to as the "parallel scanning case." In this case, the page image squeezes toward the spine and consequently the text closer to the spine become thin and difficult to recognize. Beside this "squeeze" distortion the text close to spine also bends toward the center of the page. This type of distortion is referred to as "curvature distortion" in the present specification. The abovementioned distortions not only affect the image's visual readability in the affected area but also cause failures of automatic Optical Character Recognition (OCR) methods which are commonly used to transform the scanned visual information to the corresponding text. The present invention relates to digital document analysis. When applied to scanned books, such analysis can be used to detect aspects of the scanned document, such as page areas, page orientation, text areas, and book spine.

SUMMARY OF INVENTION

This present invention provides a method and apparatus to analyze a digitized or scanned document image. The present invention uses block-based processing to create a two-channel feature image indicating the spatial characteristics of document image background and foreground. Detection algorithms are designed based on this feature image to detect the page area, page orientation, text area, and the book spine.

More specifically, an image of a scanned book is segmented using a feature image to map pixels corresponding to a page area and to create page objects. Page objects are used to determine page orientation and detect the book spine, for example.

The present invention is applicable to scanners and imaging software for digital document image processing and manipulation since its components can be employed to build various enhancement and segmentation solutions.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
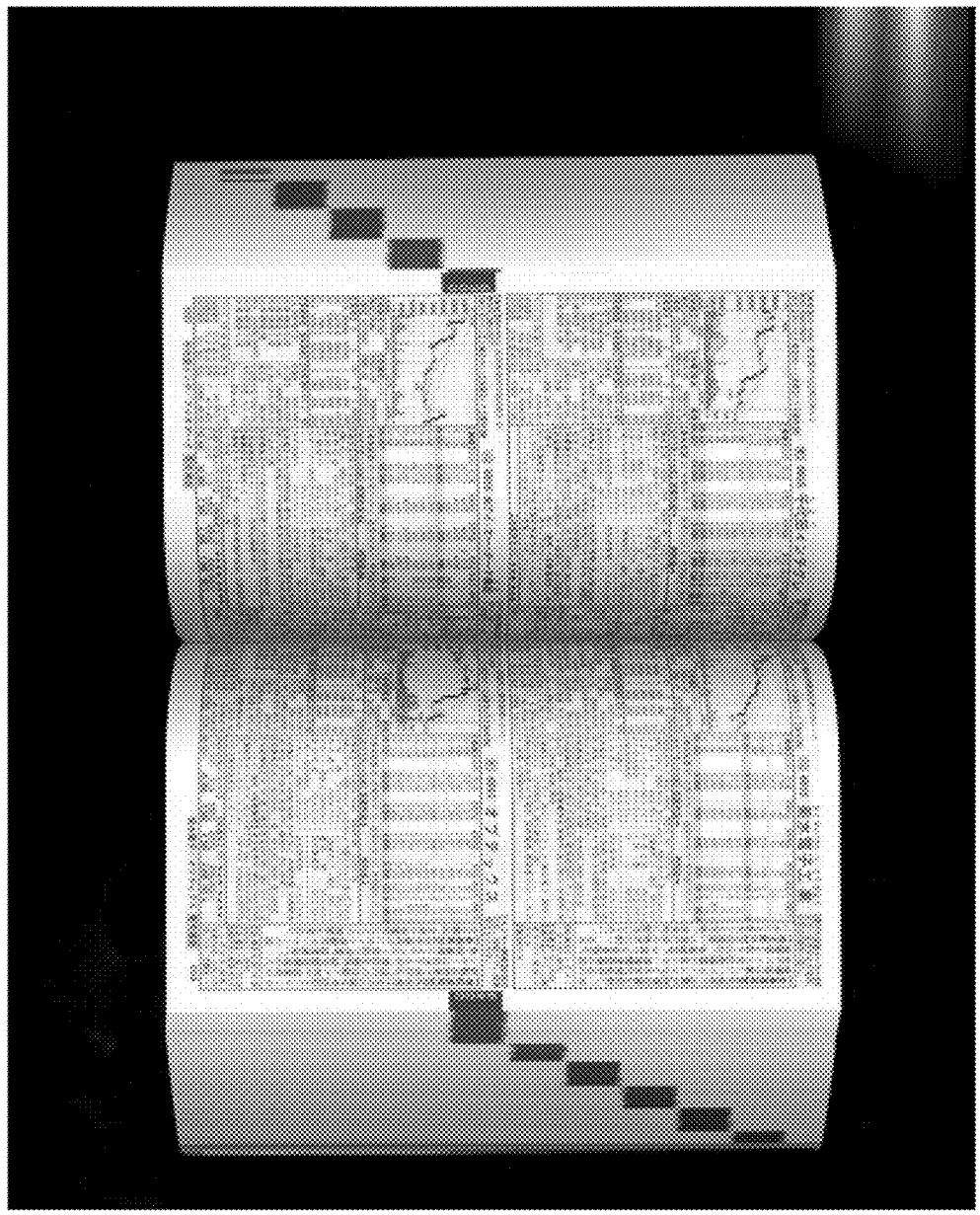
FIG. 1 illustrates a thick book that is scanned with its spine parallel to the scanner sensor bar.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for extracting features from an image, particularly a digitized or scanned document. These extracted features can then be used to analyze the document to detect, for example, a page area, distortion, and the book spine.

Example embodiments extract features from a digitized or scanned image and analyze the document to detect particular characteristics. These characteristics, used to indicate the page area, the distortion area, and the book spine area, can then be output for further image analysis and correction. Although not a part of the present invention, such correction can include intensity and warp correction. Methods consistent with the invention may be implemented in image capture devices such as flatbed scanners, as well as in software modules including printer drivers or image editing software, among other things.

These methods can be implemented using non-transitory computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of computer-executable instructions or data structures and that can be accessed by a processor of a general purpose or special purpose computer. Combinations of the above should also be included within the scope of computer-readable media.

Computer-executable instructions comprise, for example, instructions and data that cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination. An image processing device may include a feature extraction capability, for example, to extract features from an image and then to analyze the image using the extracted features. For example, an image capture device, such as a flatbed scanner, with this feature extraction and analysis capability may include one or more computer-readable media that implement the example method 300. Alternatively, a computer connected to the image capture device may include one or more computer-readable media that implement the example method 300.

Figure 2:
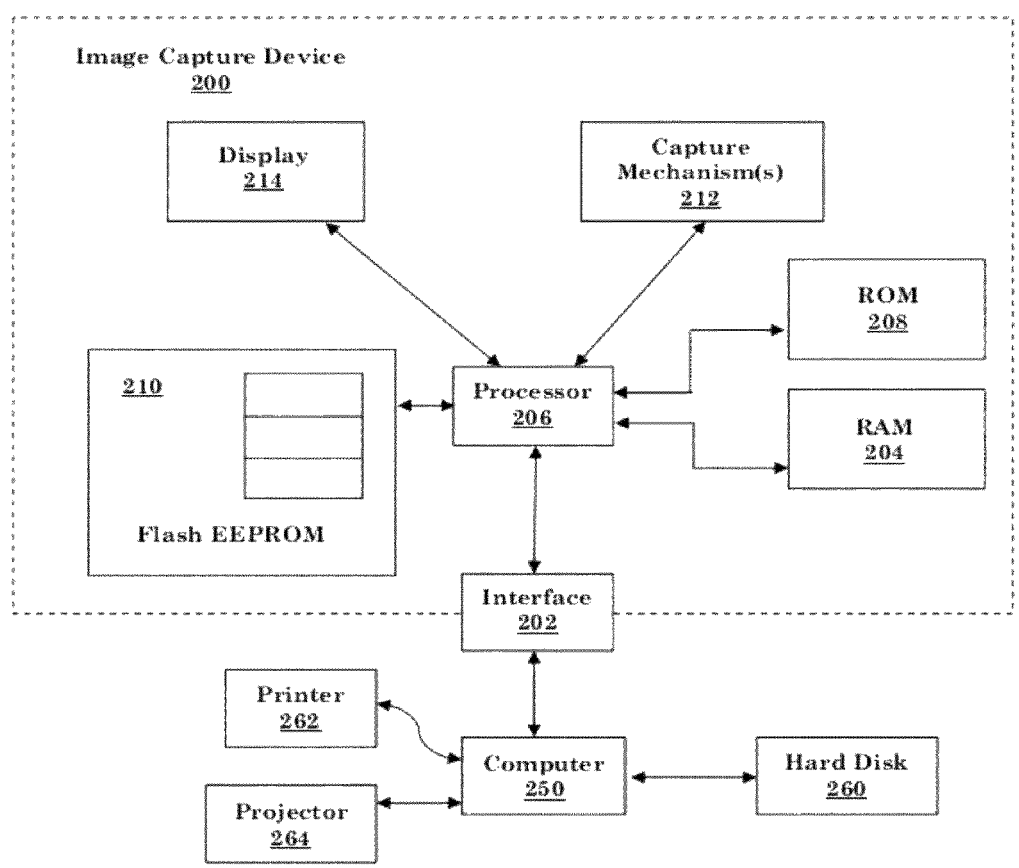
FIG. 2 is a general block diagram of an image capture device and system for utilizing the present invention.

A schematic representation of an example image capture device 200 is shown in FIG. 2. The example image capture device 200 exchanges data with a host computer 250 by way of an intervening interface 202. Application programs and an image capture device driver may also be stored for access on the host computer 250. When an image retrieve command is received from the application program, for example, the image capture device driver controls conversion of the command data to a format suitable for the image capture device 200 and sends the converted command data to the image capture device 200. The driver also receives and interprets various signals and data from the image capture device 200, and provides necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by the image capture device 200 from the capture mechanism(s) 212, the flash EEPROM 210, or the ROM 208. For example, the capture mechanism(s) 212 can generate a digital image by scanning a source document, such as a book. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the methods of the present invention for example. Where the data in the receive buffer of the RAM 204 is a digital image, for example, the processor 206 can implement the methodological acts of the methods of the present invention on the digital image to extract features in the digital image and further analyze the image based on the extracted features. Further processing in an imaging pipeline may then be performed on the digital image before the image is displayed on a display 214, such as an LCD display for example, or transferred to the host computer 250, for printing on printer 262, projected with projector 264, or stored on hard disk 260, for example.

The example method 300 for extracting features in an image and further analyzing the image based on the extracted features will now be discussed in connection with FIG. 3. Prior to performing method 300, an input image can be targeted for various image processing operations. The input image may a grayscale image, a binary image, a digital color image or a digitized or scanned version of a color image. Various image processing techniques may be applied to the input image before method 300 is performed. For ease of understanding, the following discussion will be divided into the following sections:

A. Input image
B. Feature image formation
C. Feature image analysis and segmentation
D. Page area, page orientation, and text area detection
E. Book spine detection, and
F. Summary discussion.

A. Input Image

Figure 3:
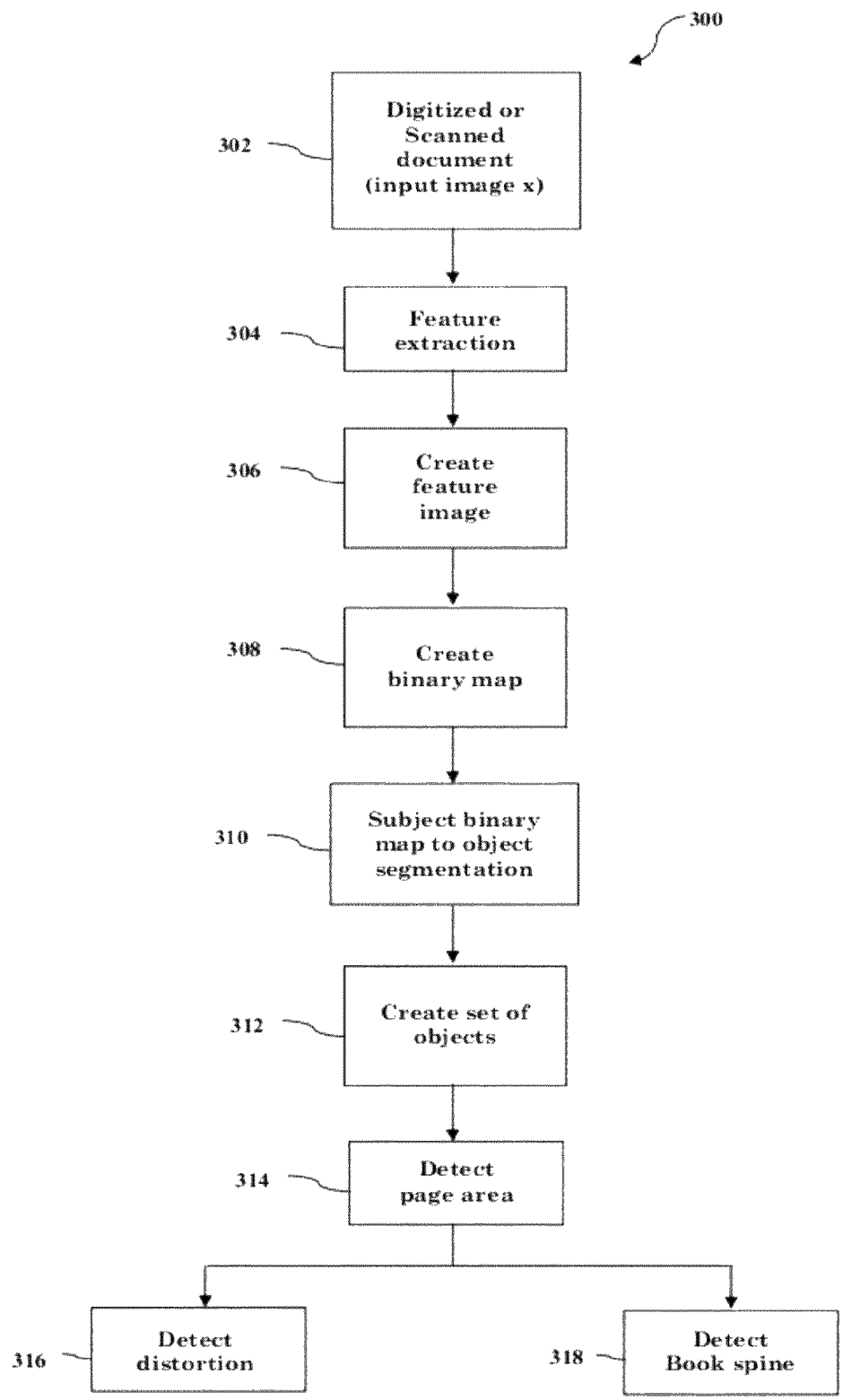
FIG. 3 is a flowchart of the general method of the present invention.

In step 302, FIG. 3, a digitized or scanned document constitutes a digital image x with $K_1 \times K_2$ pixels $x_{(r,s)}$ where (r,s) denotes the pixel location with r=1, 2, . . . , $K_1$ indicating the image row, and s=1, 2, . . . , $K_2$ indicating the image column. An object of the present invention is to analyze the content of the input image x, primarily for the purpose of scanned book document analysis. It should be understood, however, that the framework of the present invention can be readily adopted for any type of scanned documents such as books, letters, checks, receipts, prescriptions, etc.

B. Feature Image Formation

Since scanners typically scan the whole surface of the scanning area and both dimensions and position of the scanned document on the scanner's surface may vary significantly, the present invention employs feature extraction (step 304, FIG. 3) to form a feature image for subsequent analysis. To achieve robustness against various scanning defects and noise introduced into the digitized document images during the scanning process the present invention processes the input image on a block basis. Namely, a block of $g_1 \times g_2$ pixels is selected, where $g_1$ denotes the number of image rows and g denotes the number of image columns inside the block. This block is used to extract both foreground and background, which are the two fundamental features of any document image. To allow high-speed processing, the present invention transforms each block of pixels in the image x into a single-pixel in the feature image (step 306). Thus, given the input image size and the block size, the feature image z consists of $K_1/g_1 \times K_2/g_2$ pixels, and it is a two-channel image with pixels $z_{(m,n)}=[f_{(m,n)}, b_{(m,n)}]$, for m=1, 2, . . . , $K_1/g_1$ and n=1, 2, . . . , $K_2/g_2$. The terms $f_{(m,n)}$ and $b_{(m,n)}$ denote, respectively, the foreground and background components of the vectorial pixel $z_{(m,n)}$. Each of the foreground and background components will be an 8-bit value, for example. Eight bits allow for 256 discrete values. Thus each block of pixels in the image x is represented by a single pixel $z_{(m,n)}$ having two 8-bit components.

Since most document images have their background significantly brighter than their foreground (foreground can contain the text, line drawings, graphics, and images), the two components of the feature pixel $z_{(m,n)}$ can be determined as follows:

$$f_{(m,n)}=\min\{x_{(r,s)};(m-1)g_1<r\leq mg_1,(n-1)g_2<s\leq ng_2\} \quad (1)$$

$$b_{(m,n)}=\max\{x_{(r,s)};(m-1)g_1<r\leq mg_1,(n-1)g_2<s\leq ng_2\} \quad (2)$$

where min and max are the minimum and maximum operators, respectively. Equations (1) and (2) illustrate the generation of the feature image. Taking the most top-left pixel in the feature image as an example, its corresponding block in the input image is the top-left $g_1 \times g_2$ block. The foreground and background values are the smallest and largest intensity values, respectively, within this block, as defined by $f_{(1,1)}=\min\{x_{(r,s)}; \text{ for } 0<r\leq g_1, 0<s\leq g_2\}$ and $b_{(1,1)}=\max\{x_{(r,s)}; \text{ for } 0<r\leq g_1, 0<s\leq g_2\}$.

As can be seen in the above equations, the present invention divides the input image x into blocks of pixel values, each block being associated with one feature pixel $z_{(m,n)}=[f_{(m,n)}, b_{(m,n)}]$. Representing the input image by a smaller feature image (each block of pixels is reduced to one pixel) greatly reduces computational complexity of subsequent image analysis in the framework.

C. Feature Image Analysis and Segmentation

Depending on both the purpose of analysis and the intended application, the feature extraction procedure described above can be used to produce a feature image of specific dimensions or more than one feature image. Parameters $g_1$ and $g_2$ permits a trade-off between the processing speed and the level of segmentation of the image x. For example, large values of $g_1$ and $g_2$ can be used to segment scanned images on the page level whereas moderate and small values are useful when segmenting the image on the paragraph/page column and line/character levels, respectively.

Any of the segmentation procedures described below is based on the evaluation of components $f_{(m,n)}$ and $b_{(m,n)}$ in each pixel location of the feature image z. A small difference between the values of $f_{(m,n)}$ and $b_{(m,n)}$ indicates significant similarity between foreground and background in the block of pixels corresponding to the location (m,n) in the feature image. This can happen in text-free image regions such as document borders and regions surrounding the document in the scanning area or regions with solid graphics, for example. Therefore, page areas can be detected as follows:

$$d_{(m,n)} = \begin{cases} 1 & \text{for } b_{(m,n)} - f_{(m,n)} < \theta \text{ and } b_{(m,n)} > \vartheta \\ 0 & \text{otherwise} \end{cases} \quad (3)$$

where $\theta$ and $\phi$ are tunable parameters used to evaluate similarity between foreground and background and identify pixels with high contributions of background and foreground components. The first parameter $\theta$ is compared to the difference between background and foreground values of a pixel in the feature image. An exemplary value is 50. The second parameter $\phi$ defines the lowest background value. An exemplary value is 150. These exemplary values are selected based on the fact that the text must have a minimum contrast with the background to be readable and the background of the book image is usually bright. The term $d_{(m,n)}$ is the pixel in the binary map d of dimensions identical to that of the feature image z. The value $d_{(m,n)}=1$ indicates that the location (m,n) in the feature image corresponds to a page area, otherwise the pixel value in the binary map d is set as $d_{(m,n)}=0$.

Equation (3) is not the only solution which can be used to generate the binary object map (step 308, FIG. 3). To reduce the influence of parameters $\theta$ and $\phi$ on the segmentation performance, one can generate the binary object map as follows:

$$d_{(m,n)} = \begin{cases} 1 & \text{for } f_{(m,n)} > \beta \\ 0 & \text{otherwise} \end{cases} \quad (4)$$

where $\beta$ is the average value of $b_{(m,n)}$ components which satisfy $b_{(m,n)} - f_{(m,n)} < \theta$ and $b_{(m,n)} > \phi$. Again, the value $d_{(m,n)}=1$ indicates that the location (m,n) in the feature image corresponds to a page area, otherwise the pixel value in the binary map d is set as $d_{(m,n)}=0$. It should be understood that this invention is not limited to the exemplary solutions in Equation (3) and Equation (4), as the framework of the invention can flexibly be adopted to other solutions rather than these preferred embodiments.

In the present invention, processor 206 subjects the map d to object segmentation by grouping adjacent pixels with $d_{(m,n)}=1$ (step 310, FIG. 3). The procedure partitions the map d into N disjoint objects $O_i=\{(m,n)\in\Phi_i; d_{(m,n)}^i=1\}$, for i=1, 2, ..., N (step 312, FIG. 3). Each object is characterized by $\Phi_i$ which is the set of pixel locations (m,n) where $d_{(m,n)}^i=1$, and a $\Phi_i^y \times \Phi_i^x$ is a bounding box with height $\Phi_i^y$ and width $\Phi_i^x$. To obtain a better object segmentation result, the map d can be smoothed before creating objects by means of image filtering.

D. Page Area, Page Orientation, and Text Area Detection (Step 314, FIG. 3)

Depending on the scanning quality and resolution as well as the block dimensions, the set of objects $O_1, O_2, \ldots, O_N$ can consist of one or more true objects corresponding to the segmentation target and a number of false objects. Therefore, a set of simple constraints, for example, various geometrical constraints such as size and shape of the objects, can be used to remove undesired objects from further consideration. Specific formulations of such geometrical constraints can differ significantly depending on the segmentation target (e.g., text page area segmentation vs. character segmentation) and the implementation strategy. For example, for the purpose of text page area detection, which is one of the applications of the present invention, the goal is to remove small objects and objects with bounding boxes of irregular aspect ratios. This processing step is straightforward and can be implemented as follows:

$$O_i = \begin{cases} \{d_{(m,n)}^i = 0; (m,n) \in \Phi_i\} & \text{if } \Phi_i^y < T_y \text{ or } \Phi_i^x < T_x \text{ or} \\ & \max(\Phi_i^y, \Phi_i^x)/\min(\Phi_i^y, \Phi_i^x) > T \\ O_i & \text{otherwise} \end{cases} \quad (5)$$

where $T_y$ and $T_x$ denote the minimum height and width of an object and T is the maximum aspect ratio of the object.

These parameters can be predetermined (for example, in calibration of the scanning device or during optimization of imaging software) to achieve a desired performance or determined adaptively from the set of objects (for example, as a mean or weighted mean over all segmented objects where larger weights are associated with larger objects). An object which satisfies one or more conditions in Equation (5) is removed from the object list and this can be accompanied by setting the corresponding pixels $d_{(m,n)}$ in the binary map d to zero. Note that Equation (5) is an example implementation and that the present invention is not limited to the above embodiment.

To increase the accuracy of the bounding boxes of these objects, an object boundary refinement procedure can be used. Operating within the object's bounding box or its slightly enlarged version, one possibility is to check in both horizontal and vertical directions of the feature image for the image row and column, respectively, with the highest number of pixels with $f_{(m,n)}$ and $b_{(m,n)}$ exceeding certain thresholds. These maximum numbers can be recorded as $Y_{tot}$ in the vertical direction and $X_{tot}$ in the horizontal direction. Similarly, $Y_n$ and $X_m$, for $(m,n)\in\Phi_i$ where $\Phi_i$ is the original bounding box or its enlarged version, can be used to denote the total number of pixels with $f_{(m,n)}$ and $b_{(m,n)}$ exceeding certain thresholds in the vertical and horizontal directions, respectively, for each image column and row within $\Phi_i$. Then, the procedure eliminates all boundary image rows and columns associated with $X_m$ and $Y_n$ which do not exceed certain percentage of $X_{tot}$ and $Y_{tot}$, respectively. The refinement procedure can be repeated for all objects kept in the object list after object removal in Equation (5).

Once the object removal step has been completed, the updated object set typically consists of desired objects only. In case of scanned book documents, the result is always one or two objects, depending on the number of pages scanned. If the result of the segmentation are two objects, the page orientation can be determined based on the relative position and/or dimensions of these objects. If the result is one page only, the page orientation can be determined by comparing the height and width of the object. In doubtful cases and/or for purpose of verification of page segmentation and page orientation detection results, a page text area can be detected instead of a page area. Since the boundaries of the page text area should lie within the page area, the detection procedure, for example, can be as simple as searching within the bounding box of the object $O_i$ for the minimum and maximum values of the image row and column where $f_{(m,n)}$ is lower than a certain threshold.

E. Book Spine Detection (Step 316, FIG. 3)

In case of scanning the books, the determination of the book spine region can be of interest, for example, for the purpose of cropping the text area or separating the two pages. If the two pages have been detected, for example as objects $O_u$ and $O_v$ for $1 \leq u \leq N$, $1 \leq v \leq N$, and $u \neq v$, the determination of the book spine can reduce to simple averaging of the two bounding boxes coordinates. Namely, assuming that each of the bounding boxes is described by its top left and bottom right corners as $(m_{min}^i, n_{min}^i)$ and $(m_{max}^i, n_{max}^i)$ then the book spine location is determinable, in terms of its bounding box as $((m_{min}^u+m_{min}^v)/2, (n_{max}^u+n_{min}^v)/2)$ and $((m_{max}^u+m_{max}^v)/2, (n_{max}^u+n_{min}^v)/2)$ for horizontally neighboring pages with $O_u$ on the left of $O_v$ and $((m_{max}^u+m_{min}^v)/2, (n_{min}^u+n_{min}^v)/2)$ and $((m_{max}^u+m_{min}^v)/2, (n_{max}^u+n_{max}^v)/2)$ for vertically neighboring pages with $O_u$ above $O_v$. If one page has been detected only, the book spine is usually located on the side of the page bounding box with the gradient-like intensity drop in both channels of the feature image z.

Another solution for detecting the book spine region is to search the gap between $O_u$ and $O_v$ for pixels $z_{(m,n)}$ with the lowest values of their background. The locations of these pixels can be considered as the location of book spine pixels. In order to reduce possible noise contributions, the achieved set of darkest pixel locations can be filtered or averaged to produce robust estimates.

The accuracy of both above approaches may be limited in certain situations by the value of block size parameters $g_1$ and $g_2$. The smaller value these parameters have, the higher precision of book spine detection can be achieved. The highest precision can be potentially achieved by directly operating on the input image x. A possible solution is to search the gap between $O_u$ and $O_v$ mapped to the input image x for pixel locations with the strongest response of directional edge detectors (horizontal edge detection for horizontally neighboring pages and vertical edge detection for vertically neighboring pages). Again, possible noise contributions can be eliminated through filtering or some other post-processing. Since this book spine detection solution operates on the input image, it can be computationally much more demanding than the previous two solutions which take advantage of fast estimation and smaller dimensions of the feature image, respectively.

F. Summary Discussion

To display any detection result corresponding to the feature image z in the input image x, the object or bounding box coordinates should be multiplied by $g_1$ in the vertical direction and $g_2$ in the horizontal direction. This will transform coordinates from the feature image domain to the input image domain.

If a number of feature images need to be created, then a computationally efficient way is to first create the feature image of the largest target dimensions and then create another (smaller) feature image from the larger feature image. Depending on the target dimensions of other feature images, this approach can be iteratively repeated resulting in a feature image pyramid.

Any feature image can be enhanced prior to its analysis using low-pass filters in order to eliminate outliers in either of the two channels. If the page orientation is known, then desired enhancement can be produced using directional (for example, vertical or horizontal) filters.

If foreground pixels exhibit higher intensities than background pixels, which is easily determinable from image histogram for example, an inverse version of the original document image should be created and used as the input of the proposed method.

Finally, although this document presents embodiments for grayscale images only, the framework proposed in this invention can be readily adopted for binary and color images, as well. For binary images, the application of the proposed framework is straightforward. In the case of color images, a few approaches are possible. For example, one is to transform the three component color data into a single value (e.g., using color-to-grayscale conversion) and then to process such scalar data in the same way as the grayscale or binary data. Another possibility is to apply the proposed framework separately, in a component-wise manner, to each of the three color channels and then combine the intermediate results.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for analyzing an input image x with $K_1 \times K_2$ pixels $x_{(r,s)}$ where (r,s) denotes the pixel location with r=1, 2, . . . , $K_1$ indicating the image row, and s=1, 2, . . . , $K_2$ indicating the image column, the input image being one of a digitized image stored in a memory or a scanned image from a scanner, comprising:

using a processor to form a feature image z from the input image x by:
dividing the input image x into a plurality of blocks of pixels each block having a block size of $g_1 \times g_2$ pixels, where $g_1$ denotes a number of image rows in a block and $g_2$ denotes a number of image columns in a block,
associating each block of pixels in the input image x with a single pixel in the feature image z, with the feature image z consisting of $K_1/g_1 \times K_2/g_2$ pixels, and
outputting the feature image z for further analysis or storage in a memory,
wherein the feature image z is a two-channel image with feature pixels $z_{(m,n)} = [f_{(m,n)}, b_{(m,n)}]$, for m=1, 2, . . . , $K_1/g_1$ and n=1, 2, . . . , $K_2/g_2$, wherein $f_{(m,n)}$ and $b_{(m,n)}$ denote, respectively, the foreground and background components of a feature pixel $z_{(m,n)}$, wherein the foreground and background components of a feature pixel $z_{(m,n)}$ are respectively defined as follows:

$$f_{(m,n)} = \min\{x_{(r,s)}; (m-1)g_1 < r \leq mg_1, (n-1)g_2 < s \leq ng_2\}$$

$$b_{(m,n)} = \max\{x_{(r,s)}; (m-1)g_1 < r \leq mg_1, (n-1)g_2 < s \leq ng_2\}$$

where min and max are the minimum and maximum operators, and wherein the processor detects pages according to:

$$d_{(m,n)} = \begin{cases} 1 & \text{for } b_{(m,n)} - f_{(m,n)} < \theta \text{ and } b_{(m,n)} > \vartheta \\ 0 & \text{otherwise.} \end{cases}$$

where $\theta$ and $\alpha$ are tunable parameters used to evaluate a similarity between a foreground and a background in input image x and identify pixels with high contributions of background and foreground components, and wherein $d_{(m,n)}$ is a pixel in a binary map d of dimensions identical to that of the feature image z, and the value $d_{(m,n)}=1$ indicates that the location (m,n) in the feature image z corresponds to a page area.

2. A method as in claim 1, wherein the processor detects pages according to:

$$d_{(m,n)} = \begin{cases} 1 & \text{for } f_{(m,n)} > \beta \\ 0 & \text{otherwise} \end{cases}$$

where $\beta$ is the average value of $b_{(m,n)}$ components which satisfy $b_{(m,n)} - f_{(m,n)} < \theta$ and $b_{(m,n)} > \alpha$, and, wherein $d_{(m,n)}$ is a pixel in a binary map d of dimensions identical to that of the feature image z, and wherein the value $d_{(m,n)}=1$ indicates that the location (m,n) in the feature image corresponds to a page area.

3. A method as in claim 1, wherein the processor subjects the binary map d to object segmentation by grouping adjacent pixels with $d_{(m,n)}=1$.

4. A method as in claim 3, wherein the processor partitions the binary map d into N disjoint objects $O_i = \{(m,n) \in \Phi_i; d_{(m,n)}^i = 1\}$, for $i=1, 2, \ldots, N$, wherein each object is characterized by $\Phi_i$ which is the set of pixel locations (m,n) where $d_{(m,n)}^i = 1$ and a $\Phi_i^y \times \Phi_i^x$ is a bounding box with height $\Phi_i^y$ and width $\Phi_i^x$.

5. A method as in claim 4, wherein the processor removes small objects and objects with bounding boxes of irregular aspect ratios as follows:

$$O_i = \begin{cases} \{d_{(m,n)}^i = 0; (m,n) \in \Phi_i\} & \text{if } \Phi_i^y < T_y \text{ or } \Phi_i^x < T_x \text{ or} \\ & \max(\Phi_i^y, \Phi_i^x)/\min(\Phi_i^y, \Phi_i^x) > T \\ O_i & \text{otherwise} \end{cases}$$

where $T_y$ and $T_x$ denote a minimum height and width, respectively of an object and T is a maximum aspect ratio of the object.

6. A method as in claim 4 wherein the processor analyzes the objects to detect a page orientation in the input image x by comparing a height of the object to a width of the object.

7. A method as in claim 4 wherein the processor analyzes the objects to detect a book spine in the input image x.

8. A device for analyzing an input image x with $K_1 \times K_2$ pixels $x_{(r,s)}$ where (r,s) denotes the pixel location with $r=1, 2, \ldots, K_1$ indicating the image row, and $s=1, 2, \ldots, K_2$ indicating the image column, comprising:

an image capture unit that captures input image x;
a memory that stores input image x; and
a processor that forms a feature image z from the input image x by:
dividing the input image x into a plurality of blocks of pixels each block having a block size of $g_1 \times g_2$ pixels, where $g_1$ denotes a number of image rows in a block and $g_2$ denotes a number of image columns in a block,
associating each block of pixels in the input image x with a single pixel in the feature image z, with the feature image z consisting of $K_1/g_1 \times K/g_2$ pixels, and
outputting the feature image z for further analysis or storage in a memory,
wherein the feature image z is a two-channel image with feature pixels $z_{(m,n)} = [f_{(m,n)}, b_{(m,n)}]$, for $m=1, 2, \ldots, K_1/g_2$ and $n=1, 2, \ldots, K_2/g_2$, wherein $f_{(m,n)}$ and $b_{(m,n)}$ denote, respectively, the foreground and background components of a feature pixel $z_{(m,n)}$,
wherein the foreground and background components of a feature pixel $z_{(m,n)}$ are respectively defined as follows:

$$f_{(m,n)} = \min\{x_{(r,s)}; (m-1)g_1 < r \leq mg_1, (n-1)g_2 < s \leq ng_2\}$$

$$b_{(m,n)} = \max\{x_{(r,s)}; (m-1)g_1 < r \leq mg_1, (n-1)g_2 < s \leq ng_2\}$$

where min and max are the minimum and maximum operators, and wherein the processor detects pages according to:

$$d_{(m,n)} = \begin{cases} 1 & \text{for } b_{(m,n)} - f_{(m,n)} < \theta \text{ and } b_{(m,n)} > \vartheta \\ 0 & \text{otherwise} \end{cases}$$

where $\theta$ and $\alpha$ are tunable parameters used to evaluate a similarity between a foreground and a background in input image x and identify pixels with high contributions of background and foreground components, and wherein $d_{(m,n)}$ is a pixel in a binary map d of dimensions identical to that of the feature image z, and the value $d_{(m,n)}=1$ indicates that the location (m,n) in the feature image z corresponds to a page area.

9. A device as in claim 8, wherein the image capture unit is a scanning unit.

10. One or more tangible computer-readable media having computer-readable instructions thereon, which, when executed by a processor analyze an input image x with $K_1 \times K_2$ pixels $x_{(r,s)}$ where (r,s) denotes the pixel location with $r=1, 2, \ldots, K_1$ indicating the image row, and $s=1, 2, \ldots, K_2$ indicating the image column, the input image being one of a digitized image stored in a memory or a scanned image from a scanner, wherein:

the processor forms a feature image z from the input image x by:
dividing the input image x into a plurality of blocks of pixels each block having a block size of $g_1 \times g_2$ pixels, where $g_1$ denotes a number of image rows in a block and $g_2$ denotes a number of image columns in a block,
associating each block of pixels in the input image x with a single pixel in the feature image z, with the feature image z consisting of $K_1/g_1 \times K_2/g_2$ pixels, and
outputting the feature image z for further analysis or storage in a memory,
wherein the feature image z is a two-channel image with feature pixels $z_{(m,n)} = [f_{(m,n)}, b_{(m,n)}]$, for $m=1, 2, \ldots,$ $K_1/g_2$ and $n=1, 2, \ldots, K_2/g_2$, wherein $f_{(m,n)}$ and $b_{(m,n)}$ denote, respectively, the foreground and background components of a feature pixel $z_{(m,n)}$, wherein the foreground and background components of a feature pixel $z_{(m,n)}$ are respectively defined as follows:

$$f_{(m,n)} = \min\{x_{(r,s)}; (m-1)g_1 < r \leq mg_1, (n-1)g_2 < s \leq ng_2\}$$

$$b_{(m,n)} = \max\{x_{(r,s)}; (m-1)g_1 < r \leq mg_1, (n-1)g_2 < s \leq ng_2\}$$

where min and max are the minimum and maximum operators, and wherein the processor detects pages according to:

$$d_{(m,n)} = \begin{cases} 1 & \text{for } b_{(m,n)} - f_{(m,n)} < \theta \text{ and } b_{(m,n)} > \vartheta \\ 0 & \text{otherwise} \end{cases}$$

where $\theta$ and $\alpha$ are tunable parameters used to evaluate a similarity between a foreground and a background in input image x and identify pixels with high contributions of background and foreground components, and wherein $d_{(m,n)}$ is a pixel in a binary map d of dimensions identical to that of the feature image z, and the value $d_{(m,n)}=1$ indicates that the location (m,n) in the feature image z corresponds to a page area.

11. The one or more tangible computer-readable media as in claim 10, wherein the processor detects pages according to:

$$d_{(m,n)} = \begin{cases} 1 & \text{for } f_{(m,n)} > \beta \\ 0 & \text{otherwise} \end{cases}$$

where $\beta$ is the average value of $b_{(m,n)}$ components which satisfy $b_{(m,n)} - f_{(m,n)} < \theta$ and $b_{(m,n)} > \alpha$, and, wherein $d_{(m,n)}$ is a pixel in a binary map d of dimensions identical to that of the feature image z, and wherein the value $d_{(m,n)}=1$ indicates that the location (m,n) in the feature image corresponds to a page area.

\* \* \* \* \*